(12) United States Patent
Bruening et al.

(10) Patent No.: US 7,086,660 B2
(45) Date of Patent: Aug. 8, 2006

(54) FORCED STEERING DEVICE AND TRAILER

(75) Inventors: Ulrich Bruening, Coesfeld (DE); Klemens Weitenberg, Borken (DE)

(73) Assignee: Maschinenfabrik Kemper GmbH & CO KG, Stadtlohn (DE)

( * ) Notice: Subject to any disclaimer, the term of this patent is extended or adjusted under 35 U.S.C. 154(b) by 0 days.

(21) Appl. No.: 10/438,163

(22) Filed: May 13, 2003

(65) Prior Publication Data

US 2004/0000772 A1 Jan. 1, 2004

(30) Foreign Application Priority Data

May 18, 2002 (DE) .......................... 102 22 309

(51) Int. Cl.
*B62D 13/00* (2006.01)

(52) U.S. Cl. ...................................... 280/442
(58) Field of Classification Search ................ 280/442, 280/426, 419, 408, 773, 89.13, 90
See application file for complete search history.

(56) References Cited

U.S. PATENT DOCUMENTS

| 2,533,553 A | * | 12/1950 | Burns ........................ 280/443 |
| 3,322,439 A | * | 5/1967 | Le Mmon ................... 280/426 |
| 3,753,580 A | * | 8/1973 | Folkert ...................... 280/443 |
| 3,834,480 A | * | 9/1974 | McGee ...................... 180/419 |
| 3,910,353 A | * | 10/1975 | Ralston ........................ 172/1 |
| 4,345,775 A | * | 8/1982 | Merrifield ................... 280/443 |
| 6,273,446 B1 | * | 8/2001 | Paul .......................... 280/448 |

FOREIGN PATENT DOCUMENTS

DE 41 34 501 A 5/1992

* cited by examiner

*Primary Examiner*—Lesley D. Morris
*Assistant Examiner*—Paul Royal, Jr.

(57) ABSTRACT

The invention refers to a forced steering device of a vehicle, with a master cylinder, which extends between the vehicle-stationary point and a point following the steering movement and is connected to a slave cylinder coupled for the forced steering of a wheel. It is proposed to have a force-limiting element absorb the movement between the vehicle-stationary point and the point following the steering movement, as soon as the pressure in a chamber of the master cylinder exceeds a predetermined threshold value.

21 Claims, 5 Drawing Sheets

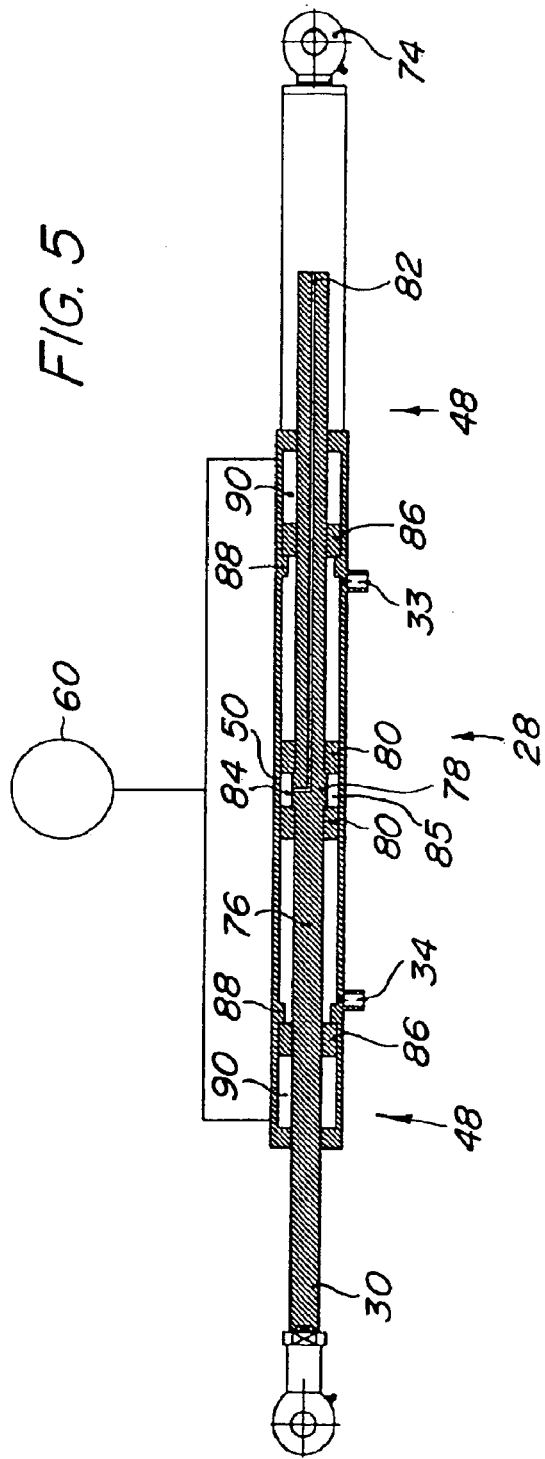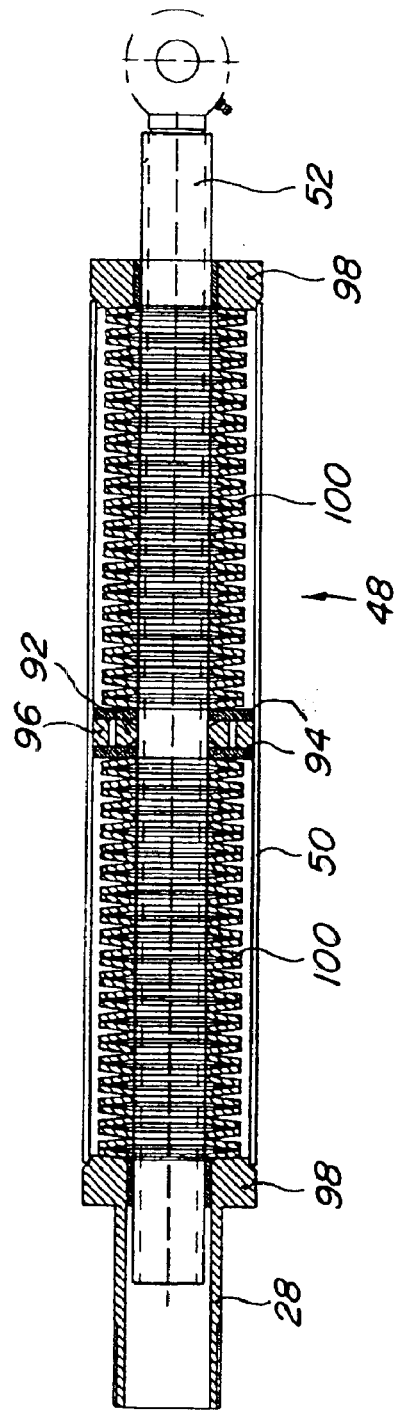

FORCED STEERING DEVICE AND TRAILER

FIELD OF THE INVENTION

The invention concerns a forced steering device of a vehicle, with a steerable wheel, which is connected to a steering element in a steered drive, which is connected to a point following the steering movement.

BACKGROUND OF THE INVENTION

As a rule, forcibly steered vehicles comprise a hydraulic master cylinder to receive the steering movement and a slave cylinder which steers a forcibly steered wheel. With trailers, for example, for agricultural purposes, the master cylinder, as a rule, is placed with one end coupled to the chassis of the trailer and the other end, located laterally, next to the coupling of the trailer to the drawbar of the tractor. When driving through curves, wheels of one axle of the trailer are steered according to the movement of the tractor with respect to the trailer, which advantageously results in better curve driving behavior and reduced tire wear. With three-axle vehicles, two axles are steered.

However, for example, as a result of different steering points on different tractors or when changing the tire sizes of the tractor, situations are conceivable in which the master cylinder undergoes a greater steering movement than the slave cylinder is able to execute. Relatively high pressures thereby arise in the hydraulic system of the forced steering device, which can lead to damage to the parts of the hydraulic system.

DE 41 34 501 A describes a truck in which a trailer control axle is forcibly adjusted by a hydraulic cylinder. The hydraulic cylinder can be connected via a valve to a pressure source, whose pressure is limited by a pressure limiting valve. A limitation of the pressure takes place in the controlled hydraulic cylinder, but with a steering system which is basically constructed differently. The teaching of this publication cannot be transferred to a forced steering of the initially mentioned type.

SUMMARY OF THE INVENTION

According to the present invention, there is provided an improved forced steering device.

An object of the invention is to provide a forced steering device which is characterized by increased operating safety.

A more specific object of the invention is to provide a forced steering device which has a steered drive connection with a steering element, wherein a force force-limiting element absorbs movement of the steering element as soon as the steering force acting on the wheel exceeds a predetermined threshold value.

The objects are achieved by providing a force-limiting element set up to absorb the movement between the vehicle-stationary point and the steering element, which is connected with the point following the steering movement, as soon as a predetermined steering force is exceeded. In this way, no excess steering forces can act on the wheel.

In one embodiment, the steering element, which is connected with the point following the steering movement of the tractor, is mechanically connected to the wheel by a suitable chain of motion transmitting components. This transmission chain comprises, for example, rods, levers, and/or shafts. The force-limiting element is inserted into the transmission chain. As long as the steering force on the wheel remains below the threshold value, the force-limiting element is neutral and thus does not change the transmission behavior of the transmission chain. If, on the other hand, the steering force on the wheel reaches the threshold value, then the force-limiting element absorbs the additional steering movement in that it is under compression or tension. Thereby, no additional steering forces act on the wheel.

In another embodiment, the steering movement is transmitted hydraulically from the steering element to the wheel. A master cylinder extends between a vehicle-stationary point and the steering element. The wheel is coupled to a slave cylinder, which is arranged so as to steer the wheel. The force-limiting element absorbs the movement of the steering element as soon as a predetermined pressure in the slave and/or master cylinder is reached. Thus, as soon as the forcibly steered wheel bumps against a stop and a specific pressure is built up in the slave or master cylinder, the force-limiting element is mechanically compressed or tensioned.

This makes it possible for the pressure in the master cylinder not to rise further when the limit values of the steering movement of the forcibly steered wheel are reached. It is limited to a maximum value, at which there is no risk of damage to the hydraulic system of the forced steering.

The force-limiting element can be located between the master cylinder and the vehicle-stationary point or between the point following the steering movement and the master cylinder. Embodiments are also conceivable in which a first force-limiting element is located between the point following the steering movement and the master cylinder and a second force-limiting element, between the master cylinder and the vehicle-stationary point, which of the two force-limiting elements that yields under the tension or compression is basically arbitrary. In another embodiment, the force-limiting element is coupled to the slave cylinder.

In a preferred embodiment, the force-limiting element is built as a pressure medium cylinder, in particular, a pneumatic or hydraulic cylinder. Within one housing, a piston is mounted so that it can move axially. The piston can move only against the pressure of a pressure medium filling an interior space of the housing, which is under a defined pressure, and preferably made available by a pneumatic pressure storage unit. The piston is then coupled to the master cylinder and the housing, with the vehicle-stationary point or the point following the steering movement or in the reverse direction. If the pressure in the master cylinder, and thus the force acting on the force-limiting element, exceeds the defined value, which is a function of the pressure of the pressure medium, the piston moves against the pressure of the pressure medium. The force-limiting element is compressed or tensioned.

The force-limiting element is appropriately set up so as to be effective with both possible stops of the steering movement. Therefore, two pistons and interior spaces under defined pressure are to be provided, one of which is under compression and the other under tension. In a simple embodiment, a double-acting pressure medium cylinder is used, in which the two axial outside surfaces of one single piston are placed within one interior space of the housing, which is filled with pressure medium. The piston is in the middle of the housing if the steering is in its straight-ahead position, so that the same paths are available for either direction. The interior spaces preferably communicate with a pressure storage unit, which makes available the defined pressure of the pressure medium.

In another embodiment, the piston is arranged so that it can be displaced axially by a rod that can be displaced axially in the housing. The rod is coupled to the master cylinder and the housing to the vehicle-stationary point or the point following the steering movement or in the reverse direction. The rod has a carrier that projects radially on which an axial interior surface of the piston comes to a stop. The housing is provided with a ring projecting inwardly, on which the axial interior surface of the piston also fits tightly. On either side of the carrier and the ring, a piston is present. The steering force is thus transmitted via the housing and the ring onto one of the pistons, on the outside surface of which the pressure of the pressure medium acts. During the steering, the pressure in the interior space of a piston is increased, since its axial outside surface is acted upon by a force that acts in the direction of reducing the volume of the interior space. As soon as the force in the master cylinder, and thus the force acting on the force-limiting element, exceeds the defined threshold value (fixed by the pressure on the outside of the piston), the affected piston moves with respect to the rod. The housing is thus displaced with respect to the carrier and the rod (and vice versa), and the force-limiting element is compressed or tensioned. The unaffected piston remains stationary with respect to the rod, since it fits tightly on the carrier. In order to avoid the formation of an excess pressure in the space between the two pistons, a radial venting borehole in the housing connecting it with the ambient air, is advantageous. This embodiment has the advantage that on the axial outside surface of the piston, the interior spaces can be connected together with a single pressure storage unit, which makes available the defined pressure in the interior spaces.

Another embodiment is characterized in that the force-limiting element can be integrated into the housing of the master cylinder. On each axial outside surface of the master cylinder, there is an interior space, and a piston that absorbs the steering movement when the predetermined threshold value of the pressure in the master cylinder is exceeded. The interior space under a defined pressure is thus on the axial outside surface of the master cylinder. The axial outside surface of the piston is located in this interior space, whereas its axial inside surface communicates with the chamber of the double-acting master cylinder adjacent to it, so that it conducts the pressure medium. The piston is supported on a piston rod so that it can be displaced axially; the piston rod itself can be displaced axially in the housing. The piston rod is coupled with the piston of the master cylinder and the housing, with the vehicle-stationary point or the point following the steering movement, or in the reverse direction. The rest position of the piston can be defined by a ring on the circumference of the cylindrical housing, against which the axial interior surface of the piston fits tightly. If the pressure in the chamber of the master cylinder, which also acts on the interior of the piston, exceeds the defined pressure on the outside of the piston, the piston moves toward the outside, so that the pressure in the master cylinder no longer continues to rise. Preferably, the two interior spaces are connected to a common pressure storage unit.

In this embodiment, the possibility also exists of placing the piston of the master cylinder so that it can be displaced on the piston rod, wherein between the pistons, a radially projecting carrier, which is connected to the piston rod, is located. The piston, which is not pushed by the carrier during steering, can thus remain stationary with respect to the housing. The space between the two pistons is preferably vented, which can take place via an axial borehole in the piston rod. This borehole can extend in the direction of the vehicle-stationary point or the point following the steering movement.

Finally, the force-limiting element can comprise a spring instead of a pressure medium cylinder (or in addition thereto), so as optionally to absorb the steering forces. Preferably, two pre-stressed springs are used, which are forcibly centered in the straight-ahead position. As soon as the pressure in the master cylinder exceeds the threshold value, one of the springs is compressed or tensioned. Then, the movement element absorbs the movement between the vehicle-stationary point and the point which absorbs the steering movement.

In this embodiment, the force-limiting element preferably comprises a housing in which a rod is located in such a way that it can be axially displaced. The rod is provided with a carrier which projects radially, which is located approximately in the middle of the housing in the straight-ahead position. An element, e.g., a disk, which is supported so that it can be displaced in the axial direction with respect to the rod and the housing, is located on the two outside surfaces of the carrier. An end of a spring fits tightly on the outside surfaces of the element. The other ends of the spring are supported on the outside ends of the housing. The springs are, for example, pre-stressed plate spring packs. For the centering of the springs in the straight-ahead position, a ring is located on the inside of the housing; an element can come to a stop on its axial outside surfaces also. If the steering is located in the straight-ahead position, the ring is thus located radially outside the carrier, and the two elements fit tightly on the ring and on the carrier. The pressure in the master cylinder acts on the force-limiting element, which, because of the pre-stress of the springs, remains rigid as long as the master cylinder absorbs the steering movement. If the pressure in the master cylinder exceeds a threshold value (defined by the pre-stress of the springs), the carrier presses the springs together, which are under stress; the force-limiting element is tensioned or compressed.

The forced steering with a force-limiting element in accordance with the invention can be used on any vehicle. It could absorb the steering movement on automotive vehicles—for example, on the steering axle, and transmit it to wheels of a forcibly steered axle. Preferably, it is used, however, on trailers for agricultural purposes, in which the master cylinder is steered between the frame of the trailer and a point next to the coupling of the tractor. Such trailers are loading wagons and scattering wagons, e.g.

BRIEF DESCRIPTION OF THE DRAWINGS

The drawings show six embodiment examples of the invention, described in more detail below.

FIG. 5, a sectional view of another master cylinder, which can be used instead of the one shown in FIG. 2;

FIG. 6, a sectional view of yet another force-limiting element of the master cylinder, which can be used instead of the one shown in FIG. 3;

DESCRIPTION OF THE PREFERRED EMBODIMENT

Figure 1:
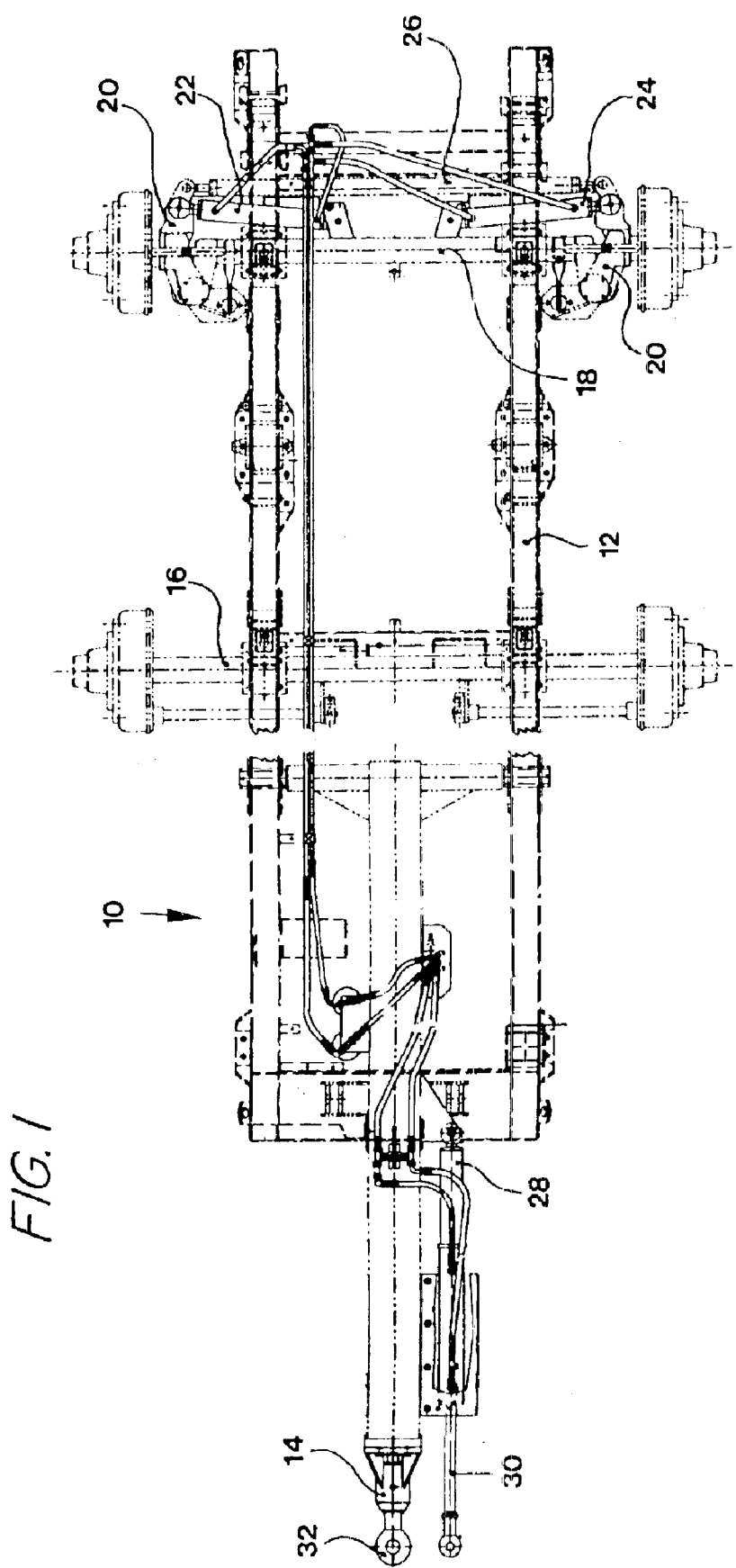
FIG. 1, a schematic top view of a trailer chassis with a forcibly steered axle.

FIG. 1 shows the top view of a trailer chassis 10. Any structure can be mounted on the chassis. For example, a dung scattering unit including a container with conveying and ejection devices for the distribution of stable dung could be mounted on the chassis; or a loading wagon including a collection device for crop material lying in a swath and a conveyor for transferring the material to the back of the wagon could be mounted on the chassis. The trailer 10 is particularly suitable for agricultural purposes.

The chassis comprises a rectangular frame 12, with a tongue including a shaft 14 affixed to its front end, relative to the direction of travel. In the rear area of the chassis, a first rigid axle 16 is affixed, and behind it, in the direction of travel, a second axle 18. On the outer ends of each of the axles 16 and 18, provision is made for the mounting of rubber tires. The rear axle 18 includes wheel holders 20 at its opposite ends, which are articulated on the frame 12 in such a way that they pivot about respective upright king pins and are connected to one another by a tie bar 26. A right slave cylinder 22 is placed between the right wheel holder 20 and the frame 12, and a left slave cylinder 24 is placed between the left wheel holder 20 and the frame 12. The slave cylinders 22 and 24 are hydraulically connected with a master cylinder 28, which is articulated on one end of the frame 12, and on the other end can be affixed on a tractor by a connecting rod 30 as a steering element at a distance from a coupling ring 32 of the shaft 14. During travel, the master cylinder 28 is compressed and tensioned when moving around curves in accordance with the movement of the tractor. Hydraulic fluid located in the cylinder 28 is thereby displaced and brings about corresponding movements of the slave cylinders 22 and 24, which lead to steering movements of the wheels of the rear axle 18. In this way, the curve following behavior of the trailer 10 is improved.

Figure 2:
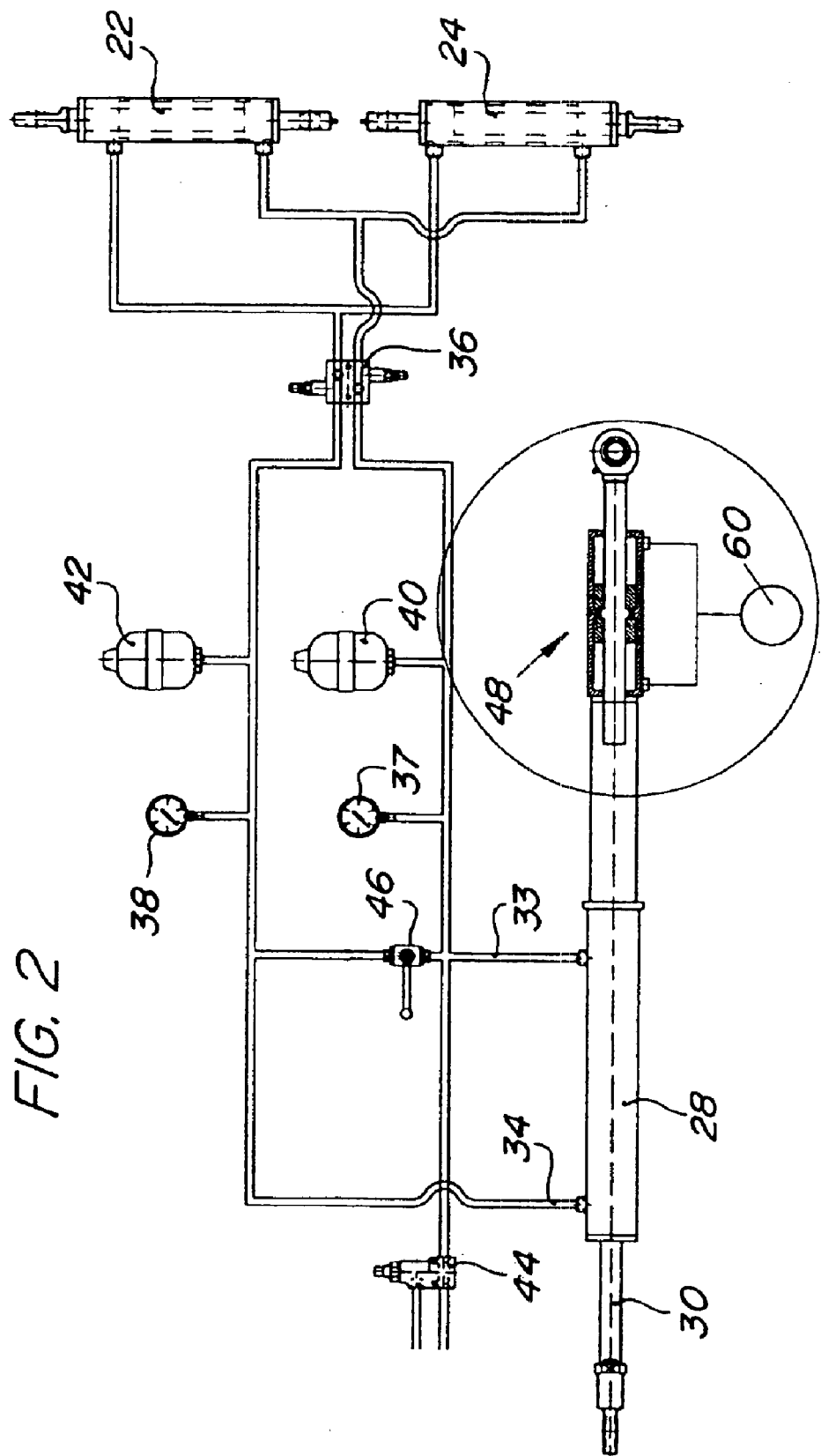
FIG. 2, a schematic of the hydraulic circuit for effecting the forced steering.

FIG. 2 shows the hydraulic circuit which effects the forced steering of the trailer 10. The master cylinder 28 is a double-acting cylinder, whose chambers, separated from one another by a piston, are respectively connected to first ends of conduits 33 and 34, having respective second ends coupled to a double-acting pressure limiting valve 36, in turn, having respectiveports coupled to first and second chambers of each of the double-acting slave cylinders 22 and 24. Manometers 37 and 38, for pressure control, are respectively coupled to the conduits 33 and 34, respectively in parallel with pneumatic pressure storage units 40 and 42, the latter serving for the damping of vibrations. The conduit 33 can be connected to a tank connection and a pressure connection via another pressure limiting valve 44, so as to be able to fill the hydraulic system with hydraulic fluid or empty hydraulic fluid from the hydraulic system. A stopcock 46 makes possible the connection of the conduits 32 and 34 with one another. Such a hydraulic system is already known, and therefore requires no further explanation.

With different types of tractors, the connection points for the connecting rod 30 of the master cylinder 28 are not necessarily at the same distance from the coupling which takes up the coupling ring 32 of the shaft 14. Also, when a wheel is changed on the tractor, the connection between the steering angle of the tractor and the path of the master cylinder 28 can be changed. With conventional hydraulic systems of the forced steering, relatively high pressures can be formed in the conduits 33 and 34, and in the slave cylinders 22 and 24 with greater steering angles of the tractor, since the wheel holders 20 then bump against stops. Such high pressures can lead to the destruction of parts of the hydraulic system.

Figure 3:
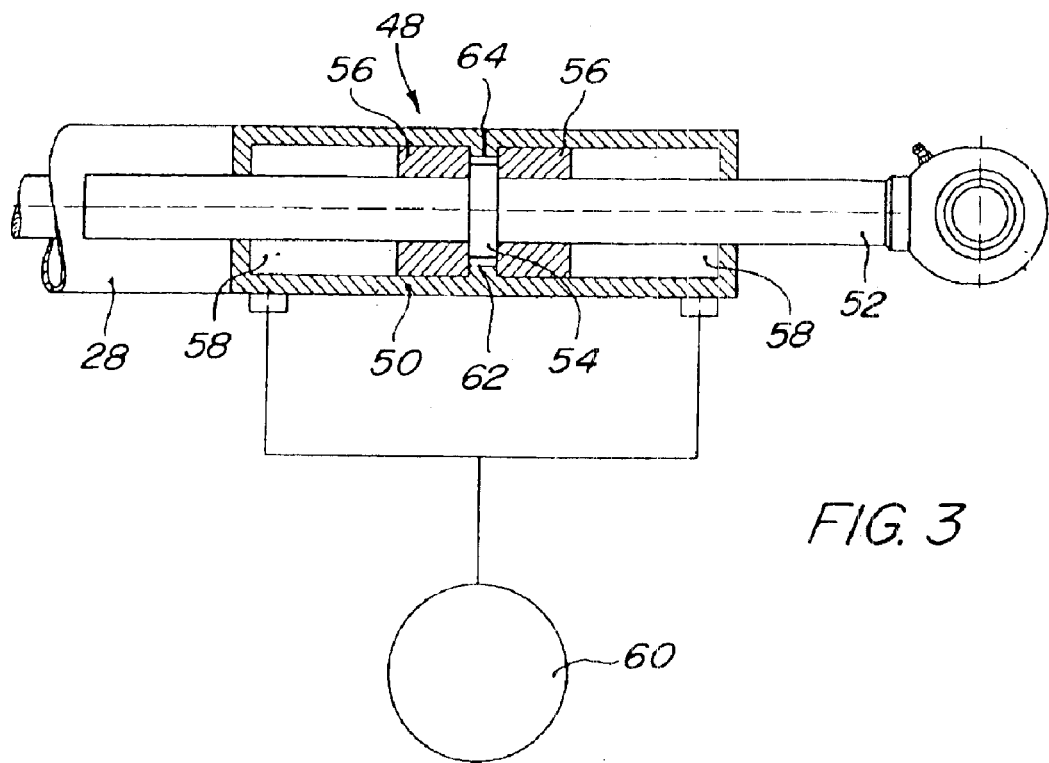
FIG. 3, an enlarged view of the force-limiting element of the master cylinder shown in FIG. 2.

In order to avoid the formation of such high pressures, a hydraulic force-limiting element 48 is inserted between the master cylinder 28 and the frame 12, as shown in the enlargement of FIG. 3. The force-limiting element 48 comprises a cylindrical housing 50, which is connected rigidly to the housing of the master cylinder 28. A rod 52, which extends axially through the housing 50 and coaxially with respect to the connecting rod 30, is located within the housing 50. It is articulated on the frame 12 of the trailer 10, outside the housing 50, and is supported in such a way that it can be displaced axially with respect to the housing 50. The rod 52 has an annular carrier 54 with a floating piston 56, which is supported so that it can be displaced axially with respect to both the rod 52 and the housing 50, filling tightly on the two outside surfaces of the carrier 54. The carrier 54 is located in the middle of the housing 50 when the towing and trailer 10 are in the straight-ahead position. The interior spaces 58 of the housing 50, respectively located at the opposite sides of the floating piston 56, are filled with hydraulic fluid and conduct hydraulic fluid between each other, and are coupled to a pneumatic pressure storage unit 60. Furthermore, the housing 50 is provided in its middle, with a ring 62, which projects inwards, and a borehole 64, which links the gap between the ring 62 and the carrier 54 with the ambient air.

The function of the force-limiting element 48 is as follows. As long as the wheel holders 20 do not bump against their stops, the master cylinder 28 is tensioned or compressed in accordance with the steering movements of the tractor. The relatively high pressure in the interior spaces 58, which is produced by the pressure storage unit 60, and is, e.g., 15 MPa, prevents the ring 62 from moving one of the floating pistons 56 with respect to the housing 50. In this way, the rod 52 that is coupled to the piston 56 by the carrier 54 also remains stationary. The length of the force-limiting element 48 remains constant. On the other hand, if the wheel holders 20 bump against their stops and a rather high pressure builds up in the hydraulic circuit of the master cylinder 28, then the floating piston 56, which is acted on by the pressure or tension from the master cylinder 28 (in fact, more or less blocked by the blocking of the wheel holders 20), can move against the pressure of the hydraulic fluid in the interior space 58, adjacent to its outside. The borehole 64 thereby prevents the formation of a reduced pressure in the space between the ring 62 and the floating piston 56. Specifically, in the compression phase of the master cylinder 28, the ring 62 presses the floating piston 56, shown on the right in FIG. 3, toward the right; and in the expansion phase of the master cylinder 28, it pulls the floating piston 56, shown on the left, to the left. The moving floating piston 56 increases the pressure in the pressure storage unit 60. The other floating piston 56 is pressed against the carrier 54 of the rod 52, and thus remains stationary relative to the rod 52 (likewise stationary, since it is connected to the frame 12). The housing 50 thus moves relative to the rod 52. The force-limiting element 48 is tensioned or compressed and absorbs the (additional) movement between the vehicle-stationary point on the frame and the point which absorbs the steering movement (articulation point of the connecting rod 30 on the tractor). In this way, the pressure in the hydraulic circuit of the forced steering system, of the embodiment illustrated in FIG. 2, is limited.

Figure 4:
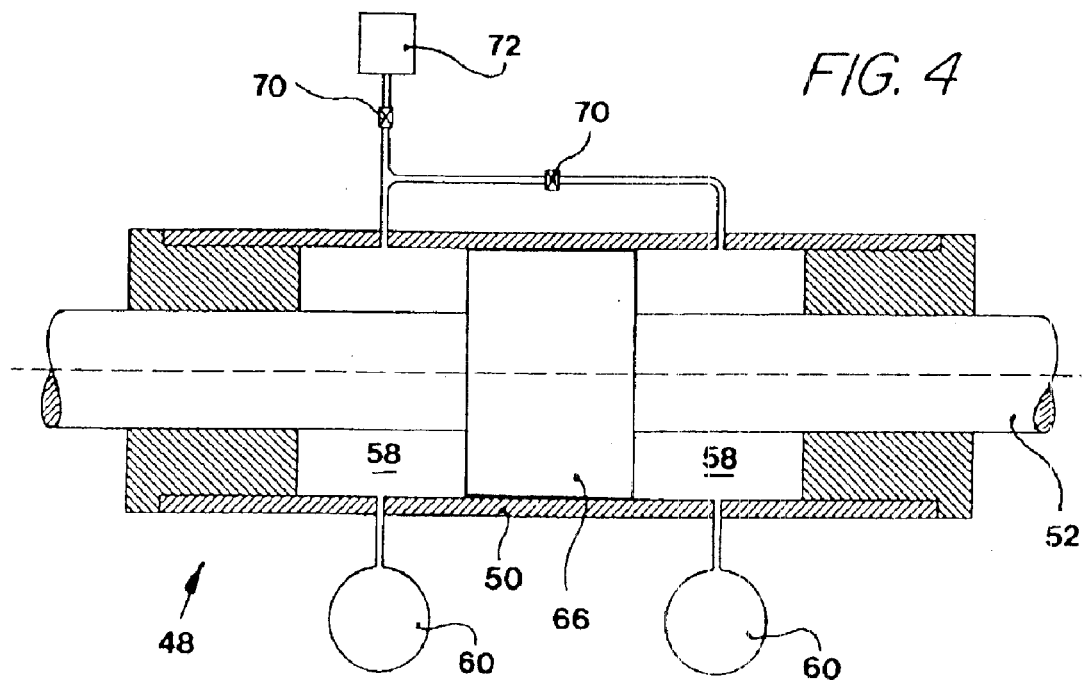
FIG. 4, a sectional view of a force-limiting element of the master cylinder, which can be used instead of the one indicated in FIG. 3.

FIG. 4 shows a second embodiment of a force-limiting element 48, which can be used with the forced steering system, shown in FIG. 2. Elements that correspond to the embodiment according to FIG. 3 have the same reference symbols. In this embodiment also, the housing 50 of the force-limiting element 48 is coupled to the housing of the master cylinder 28, and the rod 52, which is supported so that it can be displaced relative to the housing, is coupled to the frame 12 of the trailer 10. The rod 52 is tightly connected to a piston 66, which is located in the middle of the housing 50 in the straight-ahead position. The interior spaces 58 of the housing 50, on either side of the piston 66, are each connected to a different pressure storage unit 60 so that they conduct hydraulic fluid. Furthermore, they can be connected via stopcocks 70 with a hydraulic fluid pressure source 72, so that they can be filled under pressure with hydraulic fluid. The operation is similar to that of the first embodiment. If the tensile or compressive force of the master cylinder 28 exceeds the pressure in one of the interior spaces 58, the rod 52 moves with the piston 66 relative to the housing 50, and the force-limiting element 48 is tensioned or compressed. This embodiment is constituted in a simpler manner than the one shown in FIG. 3, but requires two pressure storage units 60.

A third embodiment of a force-limiting element 48 is shown in FIG. 5. It is spatially integrated into the master cylinder 28. An axially displaceable piston rod 76, which is formed integrally with the connecting rod 30 that is coupled to the tractor, is located within a housing 50, which is articulated on the frame 12 of the trailer 10 via a ring 74. The piston rod 76 is provided with a radially projecting, annular carrier 78, which is located in the middle of the housing 50 in the straight-ahead position. A floating piston 80, which is supported in an axially displaceable manner relative to the housing 50 and the piston rod 76, fits tightly on the axial outside surface of the carrier 78. The interior spaces of the housing 50 on the two axial outside surfaces of the floating pistons 80 are connected to the conduits 32 and 34 so as to conduct hydraulic fluid to the slave cylinders 22 and 24 (see FIG. 2). The piston rod 76 extends even further axially, from the carrier 78, in the direction of the ring 74. This section of the piston rod 76 is provided with an axial borehole 82, and in the area of the carrier 78, a radial borehole 84 brings a space 85 lying radially outside the carrier 78 in communication with the ambient air and prevents the formation of a reduced pressure in the space 85. In each of the two axially opposite end regions of the housing 50, an external floating piston 86 is placed so that it can be displaced axially, relative to the housing 50 and the piston rod 76. The external pistons 86 on the housing-stationary rings 88 fit tightly on their axial inside, facing the middle of the housing 50. Interior spaces 90 of the housing 50 on the outside of the external floating pistons 86 are filled with hydraulic fluid and conduct hydraulic fluid between one another and are connected to a pressure storage unit 60.

The operating mode of the embodiment, illustrated in FIG. 5, is as follows. With relatively short-stroke movements of the connecting rod 30, and thus of the piston rod 76 and the carrier 78, the floating pistons 80 follow the carrier 78 axially and bring about the forced steering movements of the slave cylinders 22 and 24 in a known manner. The same pressure that also prevails in the conduits 33 or 34 acts on the inside surfaces of the external floating pistons 86 which face the middle of the housing 50. The external floating pistons 86 remain stationary relative to the housing 50 as long as the pressure on their axial inside surfaces is less than that on their axial outside surfaces, which is defined by the pressure storage unit 60. If the pressure on the inside surfaces of one of the external floating pistons 86 exceeds the pressure on its outside surface, the affected external floating piston 86 moves outwardly. In this way, the volume of the space on the inside of the other floating piston 86 is increased, and the pressure in the conduits 33 and 34 is limited to a maximum value. The use of the internal floating pistons 80 makes it possible for the piston 80, which is not driven mechanically by the carrier 78, not to have to follow the movement of the driven piston 80. In this way, one avoids a possible reduced pressure in the pertinent chamber. Such a master cylinder could also be used in the forced steering device, as shown in FIG. 2, in combination with force-limiting elements, as shown in FIGS. 3, 4, and 6. However, in another embodiment, it would also be conceivable to replace the pistons 80 in FIG. 5 by a single piston, tightly connected to the piston rod 76.

Finally, a fourth embodiment of a force-limiting element 48 is shown in FIG. 6, which can be used with the forced steering, shown in FIG. 2. Elements in agreement with the embodiment according to FIG. 3 are marked with the same reference symbols. A rod 52, which can be connected to the frame 12 so that it can be displaced axially within the housing 50, and which is tightly connected to an annular carrier 92, is supported in the housing 50, the latter being fixed to the housing of the master cylinder 28 and arranged coaxially with it. The carrier 92 is located approximately in the middle of the housing 50 in the straight-ahead position. Disks 94, which are supported so they can be axially displaced relative to the housing 50 and the rod 52, fit tightly on both axial outside surfaces of the carrier 92. An annular stop 96 is rigidly affixed in the middle area of the interior of the housing 50. Two pre-stressed plate spring packs 100 are respectively located between the outside surfaces of the disks 94 and holding elements 98, located on the ends of the housing 50.

The operation of the embodiment illustrated in FIG. 6 essentially corresponds to the operation of the embodiment according to FIG. 4. The stop 96 produces a centering of the spring packs 100 in the center position. If the master cylinder 28 moves, for example, to the right as viewed in FIG. 6, the right plate spring pack 100 is only shifted, and not compressed. The left plate spring pack 100 is, however, compressed between the left holding element 98 and the left disk 94. Analogously, the left plate spring pack 100 is shifted left and the right plate spring pack 100 is compressed if the master cylinder 28 is moved to the left, as viewed in FIG. 6. The forces are transmitted to the rod 52 via the disk 94 facing the compressed spring pack 100 and the stop 92. The force-limiting element 48 is thus compressed or tensioned as soon as the force of the master cylinder 28 exceeds a threshold value, predetermined by the pre-stress of the spring packs 100.

Figure 7:
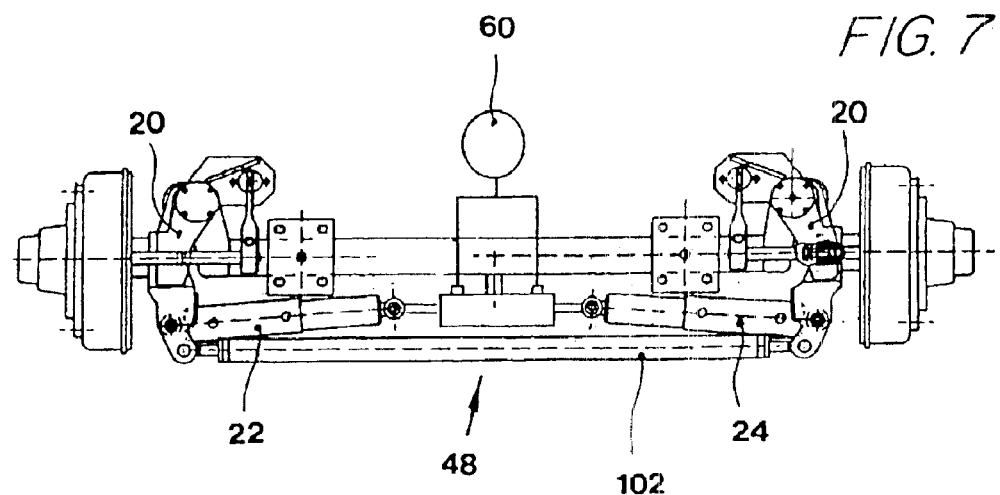
FIG. 7, a top view of the steering axle of a vehicle, in which the force-limiting element is coupled to the slave cylinder.

FIG. 7 shows a top view of another steering axle. The wheel holders 20 are connected by a tie bar 102 and connected to the pistons of respective slave cylinders 22 and 24. The housings of the slave cylinders 22 and 24 are connected to the continuous piston rod of a force-limiting element 48, whose housing is affixed on the chassis. The force-limiting element 48 corresponds to the embodiment according to FIG. 3 (but with a continuous piston rod), although the embodiments according to FIGS. 4, 5 or 6 could also be used. In the embodiment according to FIG. 7, the housing of the master cylinder 28 is tightly fixed to the chassis 12 of the vehicle 10. As soon as the pressure in the slave cylinders 22 and 24 reach a threshold value, the force-limiting element 48 absorbs the movement of the slave cylinders 22 and 24, in a manner analogous to the embodiment according to FIG. 2.

Figure 8:
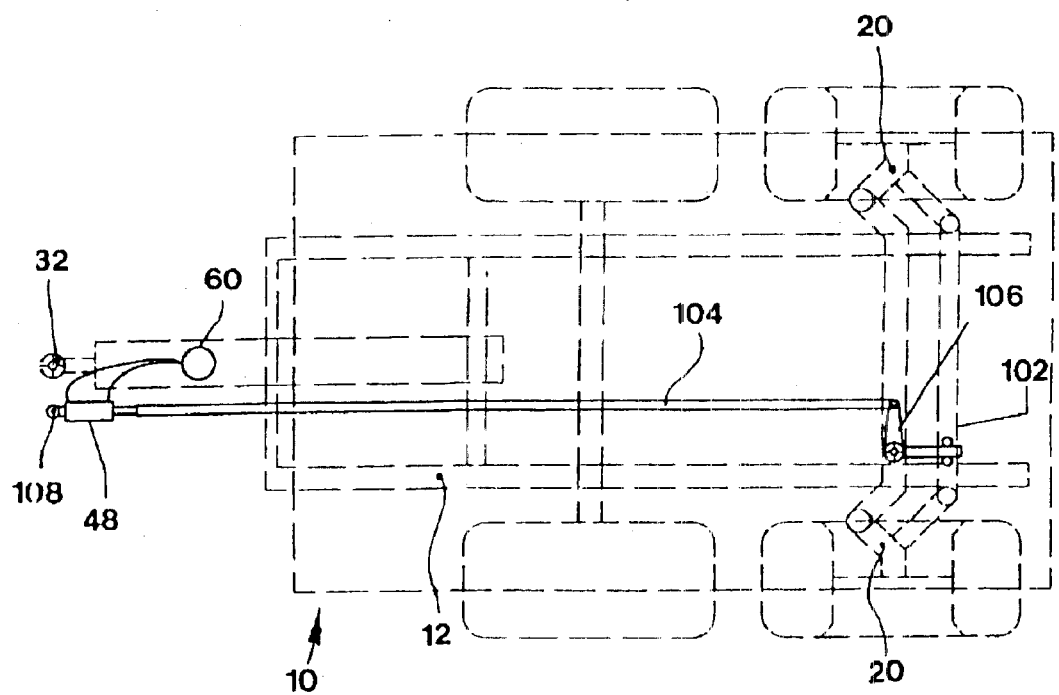
FIG. 8, a schematic top view of a trailer chassis with a mechanically forcibly steered axle, the steering forces of which are limited by a force-limiting element.

FIG. 8 shows a top view of a trailer 10 with a mechanical forced steering. The steering element 108 is connected to the tractor at a location spaced laterally from the coupling ring 32. It is connected to a steering rod 104 via the force-limiting element 48, which has a drive connection via a shift lever 106 with the wheel holders 20, the latter being coupled together by a tie bar 102. The force-limiting element 48 corresponds, in structure and function, to the one shown in FIG. 3, however, the force-limiting elements 48 according to FIGS. 4 to 6 can also be used. Thus, as soon as the steering force on the wheel holders 20 and the wheels affixed to them reach a limit value, the force-limiting element 48 is tensioned or compressed and absorbs the movement of the steering element 108.

What is claimed is:

1. In a forced steering device of a vehicle including a forcibly steered wheel, which has a steered drive connection with a steering element, where the drive connection is connected to a point following the steering movement, the improvement comprising: said steering element including a master cylinder which is mounted between a vehicle-stationary point and a point following the steering movement so as to be operated in response to a steering action; at least one slave cylinder coupled for effecting steering movements of said forcibly steered wheel; said master cylinder being connected in a pressure medium-conducting manner to said at least one slave cylinder; and a force-limiting element which absorbs the movement of the steering element as soon as the steering force acting on the wheel exceeds a predetermined threshold value.

2. The forced steering device, as defined in claim 1, wherein said force-limiting element is located such that it absorbs the movement between the vehicle-stationary point and the point following the steering movement, as soon as the pressure in a chamber of the master cylinder exceeds a predetermined threshold value.

3. The forced steering device, as defined in claim 2, wherein said force-limiting element is located between the master cylinder and one of said vehicle-stationary point or said point following the steering movement.

4. The forced steering device, as defined in claim 1, wherein said force-limiting element absorbs the movement of said at least one slave cylinder, as soon as the pressure in a chamber of the slave cylinder exceeds a predetermined threshold value.

5. The forced steering device, as defined in claim 4, wherein said force-limiting element is located between said at least one slave cylinder and said vehicle-stationary point.

6. In a forced steering device of a vehicle including a forcibly steered wheel, which has a steered drive connection with a steering element, where the drive connection is connected to a point following the steering movement, the improvement comprising: said steering element including a force-limiting element having a housing defining an interior space filled with pressure medium under pressure; and a piston arrangement being supported for moving axially in said interior space, whereby said force-limiting element absorbs the movement of the steering element as soon as the steering force acting on the wheel exceeds a predetermined threshold value.

7. The forced steering device, as defined in claim 6, wherein said piston arrangement is located approximately in the middle of said housing when said wheel is in a straight-ahead position, and wherein said interior space filled with pressure medium is adjacent to the axial outside surface of said piston arrangement.

8. The forced steering device, as defined in claim 7, and further including a pressure storage arrangement coupled to said interior space.

9. The forced steering device, as defined in claim 8, wherein said force-limiting element includes a rod mounted for axial displacement within said housing; and said piston arrangement being mounted for sliding along said rod.

10. The forced steering device, as defined in claim 9, and further including a carrier mounted for sliding along said rod inside said housing and located for being brought to a stop on an inside surface of the piston arrangement.

11. The forced steering device, as defined in claim 10, wherein said housing is provided with a ring, which projects inwardly and against which an axial inside surface of said piston arrangement can be brought to a stop.

12. The forced steering device, as defined in claim 10, wherein said piston arrangement includes separate first and second sections respectively provided on opposite sides of, and for direct engagement with, said carrier.

13. The forced steering device, as defined in claim 12, wherein a gap is defined between said first and second sections of said piston arrangement at said carrier; and a venting borehole coupling said gap to ambient air.

14. The forced steering device, as defined in claim 12, wherein said interior space filled with pressure medium includes first and second sections respectively located in communication on the axial outside surfaces of said first and second sections of said piston arrangement; said pressure storage arrangement being defined by a single pressure storage unit; and said first and second sections of said chamber both being coupled to said single pressure storage unit such that pressure medium is conducted between them and said pressure storage unit.

15. The forced steering device, as defined in claim 6, wherein said interior space filled with pressure medium includes first and second separate interior spaces defined by axial extensions at opposite ends of said master cylinder.

16. The forced steering device, as defined in claim 6, wherein said piston arrangement includes a first piston section having opposite axial sides respectively facing said first interior space and said fluid medium contained in said master cylinder, and a second piston section having opposite axial sides respectively facing said second interior space and said fluid medium in said master cylinder.

17. The forced steering device, as defined in claim 16, wherein said rod of said force-limiting device is integral with a piston rod of said master cylinder; first and second sections of said piston arrangement are supported on said piston rod in such a way that they can be displaced axially along said piston rod.

18. The forced steering device, as defined in claim 17, wherein each of said first and second interior spaces is provided with a ring at one end which projects inwardly; and said first and second piston sections respectively being located for being brought to a stop against an adjacent ring.

19. The forced steering device, as defined in claim 18, wherein said pressure storage arrangement is defined by a single pressure storage unit; and said first and second interior spaces being connected to a said single pressure storage unit in a pressure medium-conducting manner.

20. The forced steering device, as defined in claim 15, wherein said master cylinder has two pistons supported for shifting axially on said piston rod; and a radially projecting carrier being formed about said piston rod in a location between said two pistons.

21. A forced steering device, as defined in claim 20, and further including a borehole located in said piston and connecting an outer surface of said carrier with ambient air.

* * * * *